United States Patent Office 3,479,317
Patented Nov. 18, 1969

3,479,317
ADHESIVE ADDITIVES FOR CURABLE
LIQUID RESINS
Thomas E. Ferington, Sandy Spring, Md., assignor to
W. R. Grace & Co., New York, N.Y., a corporation of
Connecticut
No Drawing. Filed Dec. 19, 1966, Ser. No. 602,488
Int. Cl. C08g 51/06, 51/10
U.S. Cl. 260—37   5 Claims

ABSTRACT OF THE DISCLOSURE

Curable liquid resin compositions are produced by admixing a liquid resin, 0.5 to 10% by weight of said resin of a curing agent and 1 to 15% by weight of said resin of an adhesive additive consisting essentially of (a) a particulate group member comprising asbestos fibers and irradiation polymerized polyoxymethylene in combination with (b) 50 to 95% by weight of the adhesive additive of an organic filler, said adhesive additive being formed by jet milling together said particulate group member and filler in a fluid medium at superatmospheric pressure and temperatures ranging from ambient to 350° F. until the particulate group member has a major dimension of not more than 500 microns and a length to diameter ratio of at least 10 to 1 and thereafter separating the fluid from the adhesive additive.

---

This invention relates to a novel and useful composition of matter, a process utilizing the composition and the product resulting from the process. More particularly, it is directed to additives to increase adhesion in curable liquid resin systems, the process for preparing said adhesive curable liquid resin systems and the cured resinous adhesives resulting from said process.

One object of this invention is to provide an additive which increases adhesiveness of known curable liquid resins. Still another object is to provide a curable liquid resin having good adhesive properties. Another object is to provide a process for producing a curable liquid resin composition having good adhesive properties. Other objects and advantages of the instant invention will become apparent from a reading of the following description of the invention.

The aforesaid objects are accomplished by the present invention which provides an adhesive additive consisting essentially of a member of the group consisting of:

(1) Irradiated polyoxymethylene and asbestos fibers, said fibrous group member having an ultimate particle size with a major dimension of at least 25 microns, preferably 200–500 microns and a length to diameter ratio of at least 10 to 1, said fibrous group member being present in the adhesive additive in an amount in a range 5 to 50% by weight, preferably 15 to 33% by weight in combination with (2) 95 to 50 weight percent of the adhesive additive of an inorganic filler selected from the group consisting of metal oxides and hydroxides of silicon, aluminum, titanium, iron and zinc, kaolinite, diatomaceous earth and portland cement.

The present invention also provides a process for forming the adhesive additive which comprises:

(1) Providing a moving body of the particulate fibrous group member and inorganic filler suspended in a fluid medium at superatmospheric pressure and at temperatures ranging from ambient to 350° F.

(2) Continuously introducing additional fluid within said temperature range in a plurality of high velocity streams directed inwardly into said body in a manner to cause extreme turbulence in the mass with resulting attrition and fracturing of the suspended particles (3) Continuously removing the comminuted fibrous group member and inorganic filler from the body along with the fluid medium; and (4) Separating the agglomerate of the finally divided fibrous group member and inorganic filler from the suspending fluid.

Air and steam are the preferred suspending fluids used in forming the adhesive additive.

The most suitable apparatus for achieving comminution of the fibrous group member and filler are the fluid energy mills. These mills are well known in the art and include the jet puverizer, jet mill, micronizer and the like. The preferred mill is the micronizer in which relatively large particulate materials are suspended in a fluid medium and whirled around an enclosed case with additional fluid introduced into the whirling body in a manner causing turbulence within the body and comminution and fracturing of the fibrous particles.

In the operation of the fluid energy mill, using air as the fluid grinding medium, suitable pressure range from about 100 to 500 (preferably about 100 to 300 lbs. per square inch). The auxiliary turbulence-creating air can be injected into the whirling body of fibrous material and filler at pressures which can range from about 100 to 500 lbs. per square inch gauge and preferably about 150 to 200 p.s.i.g. The preferred air temperature is ambient but higher and lower temperatures are operable. The average particle size of the fibrous material and filler product can be varied by control of the air velocity, temperature and feed rate of the fibrous material and filler. The product can be separated from the suspending air in any suitable manner, preferably by the use of cyclone separators or bag collectors.

The normally solid polyoxymethylene used as a fibrous material in the adhesive composition in the instant invention is polymerized by irradiation of trioxane, i.e.

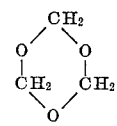

in an inert atmosphere to form polyoxymethylenes having good thermal stability and a high degree of toughness. Briefly the process involves subjecting solid trioxane to a radiation dosage of from about 0.001 to about 10.0 megarads with ionizing radiations while maintaining the trioxane at a temperature between about 0° C. and just below its melting point, and subsequently holding or ageing the irradiated trioxane at a temperature of from about 25° C. up to about the thermal degradation temperature of the reactants for a sufficient period of time to polymerize the trioxane. Preferably the trioxane is subjected to radiation dosages between about 0.02 and 1.0 megarads while at a temperature below 20° C. Subsequent polymerization is then carried out at or just below the melting point of the irradiated trioxane, i.e., at temperatures of from about 55° to about 64° C.

The polyoxymethylene fibers used in the instant invention consist of finely divided fibers of irradiation-produced polyoxymethylenes. These fibers as well as the ultrafine chrysotile asbestos fibers have a major dimension after milling of at least 25 microns, preferably 200–500 microns. The smallest dimension of the milled product varies from less than 5 to less than 1 micron. Thus the length to diameter length ratio of the ultimate milled particles is always greater than 10:1 and usually it is much higher. The chemical properties of these fine-sized fibers are essentially the same as those of the parent polymer from which they are produced. The apparent density of the fibrous material as best as can be determined is of the order of 0.01 gram per milliliter which value gives a good indication of the fluffiness and high bulk of the fibers as recovered. These recovered fibers can however be readily compressed and matted together to produce an exceptionally strong product.

The means whereby the agglomerated fibrous material and filler are attached are not as yet completely understood. Studies indicate it is more than just an electrostatic attraction or a mechanical infringement as these materials cannot be separated by normal mechanical means.

The adhesive additive is added to the curable liquid resin in an amount ranging from 1 to 15% by weight based on the curable liquid resin. Preferably an amount in the range 0.2 to 5% by weight of the adhesive composition is added to the curable liquid resin.

Within the adhesive additive itself, the weight ratio of fibrous material to filler is in the range 5 to 50, preferably 15 to 33.

As noted above, the parent polyoxymethylene polymers, from which the finely divided fibers of this invention are produced, are made by irradiation of trioxane at relatively low temperatures. These polymers are normally solid and are characterized by a high degree of toughness, relatively good thermal stability, reduced specific viscosities of from about 0.05 up to about 4.0 and preferably from about 0.25 to about 1.5, and a melting point of about 190° centigrade or above.

Thermal stability is defined by the value of the rate constant for thermal degradation at 222° centigrade. The degradation reaction is assumed to be a first order reaction which can be expressed mathematically by the differential equation:

$$-\frac{dw}{dt} = KW$$

where $t$ is time from the beginning of decomposition;
$W$ is the weight of the material remaining at time $t$;
$K$ is the rate constant for the equation.

If an unstabilized material had a thermal stability such that the value of K were greater than 2% per minute, the material would be considered too unstable to have any value as a polymer material. The value of this rate constant K for thermal degradation at 222° centigrade was determined using the syringe stability test. In this test, the number of ml. of gas evolved per gram of polymer for each five minutes of elapsed time at 222° centigrade is measured and the results converted to give a value of the rate constant K. The stability of the sample is determined by heating a sample of the polymer, weighed to the nearest milligram, to 222° centigrade in a hypodermic syringe and observing the position of the syringe cylinder at five minute intervals after the beginning of the test. A 50 ml. syringe is preferred for making the test. The syringe is cleaned and the polymer, in the form of a pressed pellet, is weighed and placed in the syringe. The syringe is lubricated between the piston and cylinder with a high quality inert oil or grease material. The syringe is evacuated and filled with nitrogen several times. Silicone oil is drawn into the syringe and ejected until about 5 ml. remains. The oil surrounding the polymer pellet serves as a means for expelling all gases before the test and as a heat transfer medium during the test. The nozzle of the syringe is then sealed and the syringe placed in a vapor bath at 222° centigrade. The vapor bath may be vapors of methyl salicylate. The position of the syringe cylinder is noted at five minute intervals after the syringe is first placed in the vapor bath. The test may be continued for periods of 30 minutes or more and the position of the syringe piston over each five minute period determined. The change in position over the heating period determines the amount of gas evolved in the test and thus the amount of polymer degraded to monomer.

The thermal degradation of the trioxane polymers generally follows that predicted for a first order reaction. The data collected in the syringe stability test is converted to give the rate constant for thermal degradation K (222) using the equation:

$$K\ (222) = \frac{\text{volume of gas evolved in ml. in time T} \times 0.0736}{\text{time T in minutes} \times \text{initial weight of the polymer sample in grams}}$$

The factor 0.0736 is a constant calculated on the assumption that the gas evolved is monomeric formaldehyde and that it follows the gas law an an ideal gas. AK (222) value of 1 in reciprocal minutes is equivalent to 1% degradation per minute. Reduced specific viscosities are determined using γ-butyrolactone containing 0.5% of 4,4′ thiobis (6-tert-butyl orthocresol) and 0.5% 2,6 di-tert-butyl-p-cresol as a solvent. In determining the reduced specific viscosity a weighed sample of the polymer was heated with a sufficient quantity of the γ-butyrolactone solvent to give a concentration of 0.1 g. per 100 ml. at 135° centigrade. The sample was heated to 155° centigrade to effect rapid solution of the polymer in the solvent. After the polymer has dissolved the liquid was added to a standard Stabin viscometer in a Hallikainen bath maintained at 135° centigrade.

The reduced specific viscosity was determined using the formula $$\frac{\eta_{sp}}{C} = \frac{\frac{t_2 - t_1}{t_1}}{C\ g./100\ ml.}$$

The unit of reduced specific viscosity is deciliter g.-l. The unit $t_2$ is defined as the running time of the solution and $t_1$ the running time of the pure solvent. The differences in reduced specific viscosity are apparent from the differences in flow time in the viscometer. The reduced specific viscosity is significant in that it is a measure of the molecular weight of the polymer. The exact relative molecular weights cannot be determined without knowing the value of the exponent $\alpha$ in the Mark-Houwink equation $n = KM^\alpha$.

The preferred process for making the adhesive additive of the instant invention comprises providing a moving particulate body of the fibrous material and filler suspended in a fluid medium at super atmospheric pressure and at temperatures between 40 and 200° F., continuously introducing additional fluid within said temperature range in a plurality of high velocity streams directed inwardly into said body in a manner to cause extreme turbulence in the mass and resulting attrition and fracturing of the suspended particles, continuously removing the comminuted, fibrous-filler product from the body along with the fluid medium and separating the finely divided fibrous-filler product from the suspending fluid. Suitable apparatus for carrying out the process is known to the art. Such apparatus is commonly known as a fluid energy mill. In this apparatus relatively large particulate material is suspended in a fluid medium whirling around in an enclosed space and additional fluid is introduced into the whirling body in a manner causing turbulence within the body and comminution and fracturing of the particles by attrition. A complete description of such apparatus and its mode of operation can be found in Perry's Chemical Engineer's Handbook, Second Edition (1941) at pages 1930–32. Other methods can also be used to comminute the fibrous material and filler and to form a finely divided fibrous-filler product therefrom. Briefly one other process comprises slurrying or suspending a mixture of the fibrous material and filler in an inert liquid, e.g. water, feeding the slurry or suspension between closely spaced grinding surfaces which rotate with respect to each other (e.g., through a colloid mill), and separating the comminuted fibrous-filler product from the suspending liquid, and drying.

In the preferred method of preparing the adhesive composition of this invention, the fibrous material is preliminarily comminuted to sizes of about 1/8 inch or less. This is required only in order to permit feeding of the fibrous material to the comminution apparatus. Because of its inexpensiveness and ready availability, the preferred fluid suspending medium is air, which may be pre-filtered if desired. Air is also preferably used as the supplemental turbulence-creating fluid. Suitable pressures of the suspension air range from about 100 to about 500 (preferably about 150 to about 250 pounds per square inch gauge) while the auxiliary turbulence-creating air is injected into the whirling body of fibrous material-filler mixture at pressures which can range from about 100 to 500 pounds per square inch gauge, and preferably of between about 180 and about 200 p.s.i.g. The preferred air temperature is from about 50° to about 300° F. Temperatures somewhat above or below this range can be used if desired but do not give any significant advantages. The finely divided fibrous material-filler mixture can be separated from the suspending air in any suitable manner, preferably by use of a cyclone separator or bag collector.

It is critical in carrying out the instant invention that the fibrous material and the filler be passed through the energy mill simultaneously in order to obtain an adhesive promoting composition. Separate passes of fibrous material and filler with subsequent blending of the finely divided material does not result in an adhesive promoting composition.

The curable liquid resins operable in combination with known curing agents and the adhesive composition of the instant invention are well known to those skilled in the art and include epoxy, phenolic, polyurethane, polysulfide, polyester, polyamide and amino resins.

The curing agents operable in the instant invention depend upon the liquid resin used in combination therewith. Typical examples include, but are not limited to, methyl ethyl ketone peroxide and dicumyl peroxide used with a polyester resin; diethylene triamine, low molecular weight polyamides, methylene dianiline, phthalic anhydride and dicyandiamide used with epoxy resins; triethylene diamine used with polyurethane resin and hexamethylene tetramine used with phenolic resin. Other well known curing agents are obvious to one skilled in the art.

To effect curing, the liquid resin and curing agent along with the instant adhesive additive are admixed and heated to a moderate temperature depending upon the liquid resin and curing agent employed. In general heating to a temperature in a range of 75° C. to 350° C. for 1/2 to 60 minutes is sufficient to cure the liquid resin and form an adhesive bond by the practice of the instant invention.

Some adhesives are activated by mixing two previously prepared components together and thereafter allowing them to cure under ambient conditions. The adhesive additives of the instant invention are operable in this latter system as well as in the system where curing is carried out at elevated temperatures.

Aside from the fact that the use of a filler is necessary to obtain an adhesive composition in the instant invention, the filler has other advantages. For example, the filler improves the ease of mixing the adhesive additive into the curable liquid resins, i.e. it stops the lumping of the fibrous material in the liquid resin. Another advantage of the use of the filler is that it decreases the propensity of the curable liquid resins to separate from the fibrous material.

It should also be noted that by the practice of the instant invention a significantly lesser amount of adhesive additive is needed to obtain high adhesive strength. This will be shown in the examples hereinafter.

The following examples are set out to explain but expressly not to limit the instant invention. Unless otherwise noted all parts and percentages are by weight.

EXAMPLE 1

Preparation of polyoxymethylene by irradiating trioxane

A suitable portion of trioxane was placed in an ordinary household baking pan and formed into a plaque by placing the pan in an ordinary steam-heated laboratory size hydraulic press, and heating by means of the press to a temperature sufficient to melt the trioxane (about 120° centigrade). The plaques was then cooled to room temperature (about 21° centigrade) and subjected (at that temperature) to an irradiation dosage of between about 0.1 and 0.5 megarads. The radiation source was high energy radiation from a Van de Graff electron accelerator. Other sources can also be used.

The irradiated plaque was then broken up into small chunks, portions of which were placed in a series of capped bottles. The bottles were then placed in a constant temperature bath maintained at 55° centigrade and the irradiated, bottled samples aged at that temperature bath for 5 hours. The bottles were then removed from the bath and water was added to each in amounts sufficient to completely immerse the polyoxymethylene formed therein. After about 24 hours the water dissolves substantially all of the unpolymerized trioxane remaining in the bottles. The polyoxymethylene was separated from the water by filtering or decanting and the polymer was air dried at about room temperature.

The recovered polyoxymethylene had reduced viscosities (measured in the manner described hereinabove) ranging from about 0.6 to about 2.4. The thermal stability constant (K (222)) of the polyoxymethylene was about 1.5, a good result for unstabilized polyoxymethylene polymers.

EXAMPLE 2

Preparation of finely divided polyoxymethylene-filler adhesive composition 1 part of polyoxymethylene from Example 1 was broken up by hand or other suitable means into particles having a major dimension of less than about 1/8" and admixed with 3 parts of fine silica (5 to 8 microns in diameter) sold under the tradename "Syloid 244" by Davison Chemical Co. These particles were suspended in a stream of air at a temperature of about 55° F. and under a pressure of about 225 pounds per square inch gauge and fed into a commercially available 8 inch fluid energy mill at a rate of about 10 grams per minute. Air at room temperature and under a pressure of 200 pounds per square inch gauge was injected into the whirling body of polyoxymethylene and filler to create a turbulent mass in the mill. The thus milled, finely-divided fibers of polyoxymethylene with the silica filler coated thereto were separated from the air stream in a cyclone separator and collected in a drum.

The milled fiber-filler product was examined under a microscope to determine size and shape. On characterization it was found that 100% of the fibers had a length to diameter ratio in excess of 10 to 1. The thus milled polyoxymethylene-silica product will be hereinafter referred to as additive A.

EXAMPLE 3

Preparation of asbestos-filler adhesive additive 1 part of a commercially available chrysotile asbestos (Canadian grade No. 5) sold under the tradename "Plastibest 30" by Johns Manville Co. and 3 parts of a calcined silica commercially available from Pittsburgh Plate Glass under the tradename "Calcined HiSil" were fed at a rate of 100 grams per minute under 120 p.s.i.g. of compressed air into a fluid energy mill i.e. a "Jet-O Mizer" (Model 202) at ambient temperatures. Air at ambient room temperatures under pressure of 120 p.s.i.g. were injected into the whirling body of the fibrous asbestos and filler to create a turbulent mass in the mill.

The thus produced, finely divided asbestos fibers-silica product was separated from the air stream in a bag collector. On chararterization 100% of the thus milled product had a length to width ratio in excess of 10 microns. The thus milled fibrous asbestos-filler product will be hereinafter referred to as additive B.

EXAMPLE 4

Example 3 was repeated except that 1 part of fibrous asbestos sold under the tradename "Plastibest 20" (Canadian grade No. 4) which is commercially available from Johns Manville Co. was substituted for the "Plastibest 30." On characterization the fibrous asbestos had a length to width ratio in excess of 10 microns. Hereinafter this fibrous asbestos-filler product will be referred to as additive C.

EXAMPLE 5

Example 3 was repeated except that 1 part of a chrysotile asbestos sold under the tradename "FM-3" (Canadian grade No. 3) by North American Asbestos Co. was substituted for the "Plastibest 30" and only 1 part of "Calcined HiSil" was admixed therewith. On characterization the length to width ratio of the fibrous asbestos was in excess of 10 microns. Hereinafter this fibrous asbestos-filler product will be referred to as additive D.

EXAMPLE 6

Example 3 was repeated except that 1 part of a chrysotile asbestos sold under the tradename "4TL" (Canadian grade 4) by Lake Asbestos Co. and 2 parts of "Calcined HiSil" were charged to the fluid energy mill. On characterization the thus milled fibrous asbestos had a length to width ratio in excess of 10 microns. Hereinafter this asbestos-filler product will be referred to as additive E.

EXAMPLE 7

Example 3 was repeated except that 2 parts of a fibrous asbestos sold under the tradename "7R5" by Lake Asbestos Co. (Canadian grade 7) were charged to the Jet-O-Mizer along with 1 part of a fine silica (5–8 microns in diameter) commercially available from Davison Chemical Co. under the tradename "Syloid 244." On characterization the thus milled fibrous asbestos had a length to width ratio in excess of 10 microns. Hereinafter the thus milled fibrous asbestos-silica product will be referred to as additive F.

The additives from Examples 2 through 7 were then added to a curable liquid polymer system in the following manner.

EXAMPLE 8

Several samples consisting of 100 parts by weight of "Epi-Rez 510," an epichlorohydrin bisphenol resin commercially available from Jones-Dabney Co. and 6 parts by weight of dicyandiamide (curing agent) were blended together in a half-gallon container and then passed over a three roll mill twice at 55 pounds pressure. 25 parts by weight of "Alumina T-60" (a filler) were added to each sample along with an adhesive additive from Examples 2–7 in the amounts as shown in Table I and mixed with a 3″ Cowles blade for approximately 10 minutes at 1500 r.p.m. The thus mixed adhesive formulations was deaired in a desiccator under vacuum and then stored in jars for various times before being used in lap strength adhesive tests. Samples were removed from storage after periods of 24 hours, 1 month, 5 months and 6 months and used in lap strength adhesive tests the procedure for which is as follows: a portion of the adhesive formulation was placed between aluminum adherends (3″ x 1″ x 10 mil thickness) and pressed under 5 lbs. pressure to give an adhesive surface of 1″ x 1″ x .004 mil thick. The thus pressed samples were placed in an oven at 177° C. for 2 hours to insure curing. The thus adhered aluminum strips were removed from the oven, pressure was released therefrom and the samples were subjected to a lap strength test to measure adhesion in (p.s.i.) in accord with the procedure of ASTM-D-1002-64. The test were run on an Instron Tester at a pull rate of 1″ per minute. The results of the adhesion tests for samples that were stored for various periods of time are shown in Table I. Also shown in Table I is a control run using a commercially available formulation from Jones-Dabney Co. wherein the filler is an organically treated bentonite clay sold under trade name "Bentone 34" by National Lead Co. along with the same portions of "Epi-Rez," dicyandiamide and "Alumina T-60" as used in the samples for the lap strength adhesion test.

TABLE I

| Example No. | Additive type | Parts by wt. | Lap shear strength after various storage periods (p.s.i.) | | | |
|---|---|---|---|---|---|---|
| | | | 1 day | 1 month | 5 months | 6 months |
| 8(a) | A | 5 | 720 | 1,000 | | 1,100 |
| 8(b) | B | 5.75 | 1,190 | | 1,131 | |
| 8(c) | C | 4.5 | 1,315 | 1,100 | | |
| 8(d) | D | 3.25 | 1,335 | 1,150 | | |
| 8(e) | E | 4.5 | 1,295 | 1,095 | | |
| 8(f) | F | 5.0 | 1,245 | 1,110 | | |
| 8(g) | Control | 25.0 | 584 | 690 | 751 | 885 |

As can be seen from Table I the amount of filler necessary when using the instant invention is greatly reduced from that now used in commercially available curable liquid adhesive formulations. In addition it can also be noted that the adhesive strength is greatly increased by the use of the adhesive additive of the instant invention over that of a known commercially available curable liquid formulation. Thus the substitution of a lesser amount of the adhesive additive of the instant invention results in greater adhesion in known curable liquid resin systems.

In addition to using chrysotile asbestos in the instant invention, it is also possible to use other types of asbestos, e.g. crocidolite asbestos. However, in using the latter type of asbestos it should be noted that the resultant additive has a bluish color which is not present when chrysotile asbestos is used.

I claim:
1. A curable composition consisting essentially of:
  (1) a liquid epoxy resin
  (2) 0.5 to 10 percent by weight of said resin of a curing agent for said resin, and
  (3) 1 to 15% by weight of said resin of an adhesive additive consisting essentially of:
    (a) particulate chrysotile asbestos fibers, said asbestos fibers having an ultimate particle size with a major dimension in the range 25–500 microns and a length of diameter ratio of at least 10 to 1, said asbestos fibers being present in the adhesive additive in an amount in the range 5 to 50% by weight in combination with
    (b) 95 to 50 weight percent of the adhesive additive of an inorganic filler selected from the group consisting of kaolinite, diatomaceaous earth, portland cement and oxides, and hydroxides of members of the group consisting of silicon, aluminum, titanium, iron and zinc,
  (4) said adhesive additive being formed by:
    (a) providing a moving body of the particulated asbestos fibers and inorganic filler suspended in a fluid medium at super-atmospheric pressure and temperatures ranging from ambient to 350° F., (b) continuously introducing additional fluid within said temperature range in a plurality of high velocity streams directed inwardly into said body in a manner to cause extreme turbulence in the moving body with resulting attrition and fracturing of the suspended fibrous particles, (c) continuously removing the agglomerated comminuted asbestos fibers and inorganic filler from the body along with the fluid medium and (d) separating the agglomerate of the finally divided asbestos fibers and inorganic filler from the fluid medium.

2. An article of manufacture comprising at least one substrate having thereon a coating of the composition according to claim 1.

3. The article of manufacture of claim 2 wherein the substrate is a member of the group consisting of metal, wood, paper, ceramic, glass, plastic, cloth, fabric and non-woven fibrous web.

4. The process of forming the article of manufacture of claim 2 which comprises the steps of applying to the substrate a curable resin composition consisting essentially of:

(1) a liquid epoxy resin (2) 0.5 to 10 percent by weight of said resin of a curing agent for said resin, and (3) 1 to 15% by weight of said resin of an adhesive additive consisting essentially of:

(a) particulate chrysotile asbestos fibers, said asbestos fibers having an ultimate particle size with a major dimension in the range 25–500 microns and a length to diameter ratio of at least 10 to 1, said asbestos fibers being present in the adhesive additive in an amount in the range 5 to 50% by weight in combination with (b) 95 to 50 weight percent of the adhesive additive of an inorganic filler selected from the group consisting of kaolinite, diatomaceous earth, portland cement and oxides and hydroxides of members of the group consisting of silicon, aluminum, titanium, iron and zinc, (4) said adhesive additive being formed by:

(a) providing a moving body of the particulate asbestos fibers and inorganic filler suspended in a fluid medium at super-atmospheric pressure and temperatures ranging from ambient to 350° F.

(b) continuously introducing additional fluid within said temperature range in a plurality of high velocity streams directed inwardly into said body in a manner to cause extreme turbulence in the moving body with resulting attrition and fracturing of the suspended fibrous particles, (c) continuously removing the agglomerated comminuted asbestos fibers and inorganic filler from the body along with the fluid medium, (d) separating the agglomerate of the finally divided asbestos fibers and inorganic filler from the fluid medium, and 5. The process according to claim 2 wherein the contact with the substrate for a time sufficient to effect adhesion therebetween.

5. The process according to claim 12 wherein the fluid medium is selected from the group consisting of air and steam.

References Cited

UNITED STATES PATENTS 3,240,736    3/1966    Beckwith _____ 260—37 X
3,293,205    12/1966    Doyle et al. _____ 260—37

MORRIS LIEBMAN, Primary Examiner

L. T. JACOBS, Assistant Examiner

U.S. Cl. X.R.

217—161